Sept. 11, 1951  A. W. L. HARTBAUER  2,567,477
GASKET STRUCTURE FOR REFRIGERATOR CAR DOORS AND THE LIKE
Original Filed Dec. 12, 1941  3 Sheets-Sheet 1
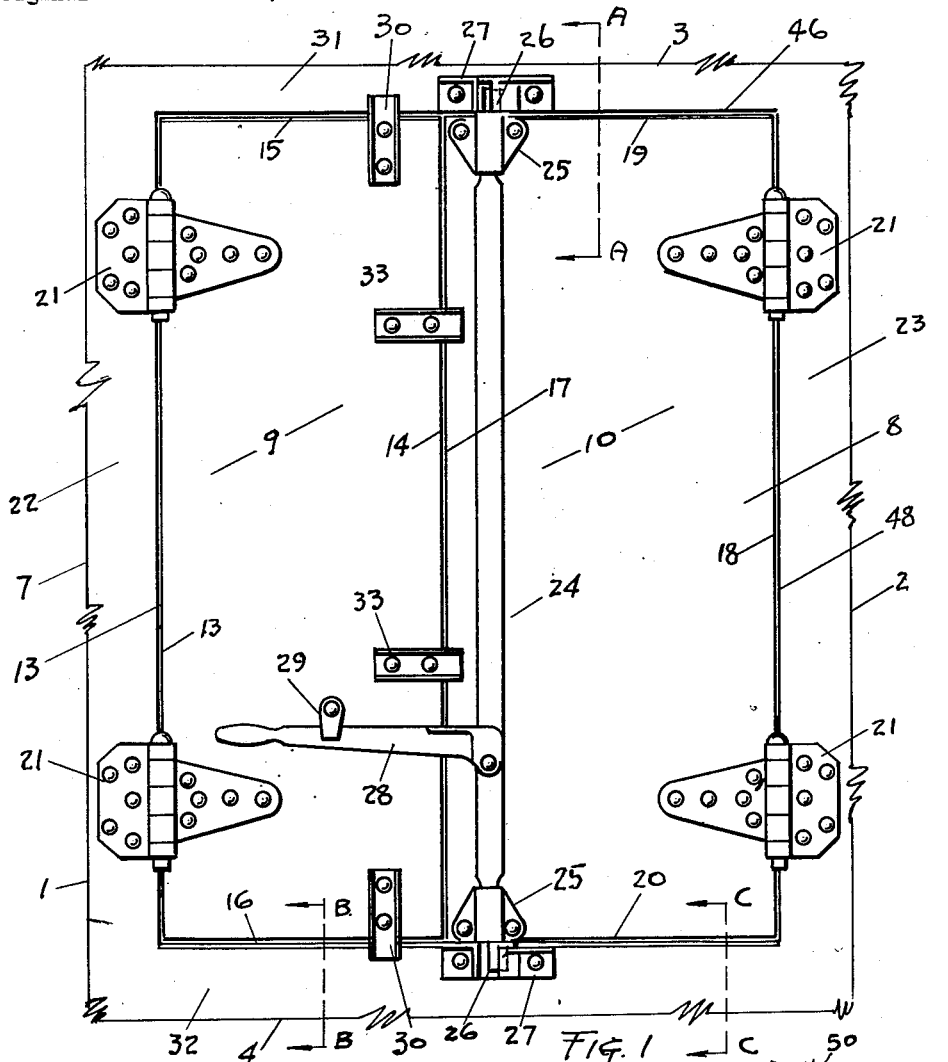
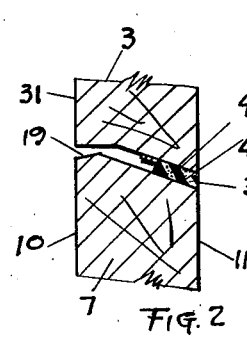
FIG. 2
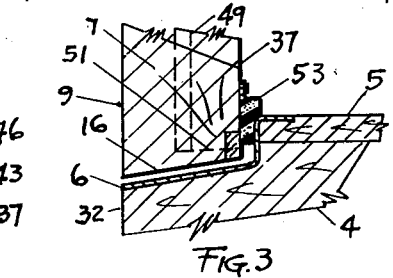
FIG. 3
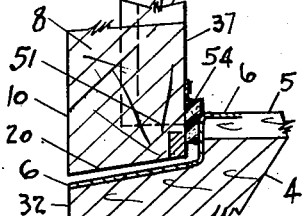
FIG. 4
INVENTOR
August W. L. Hartbauer

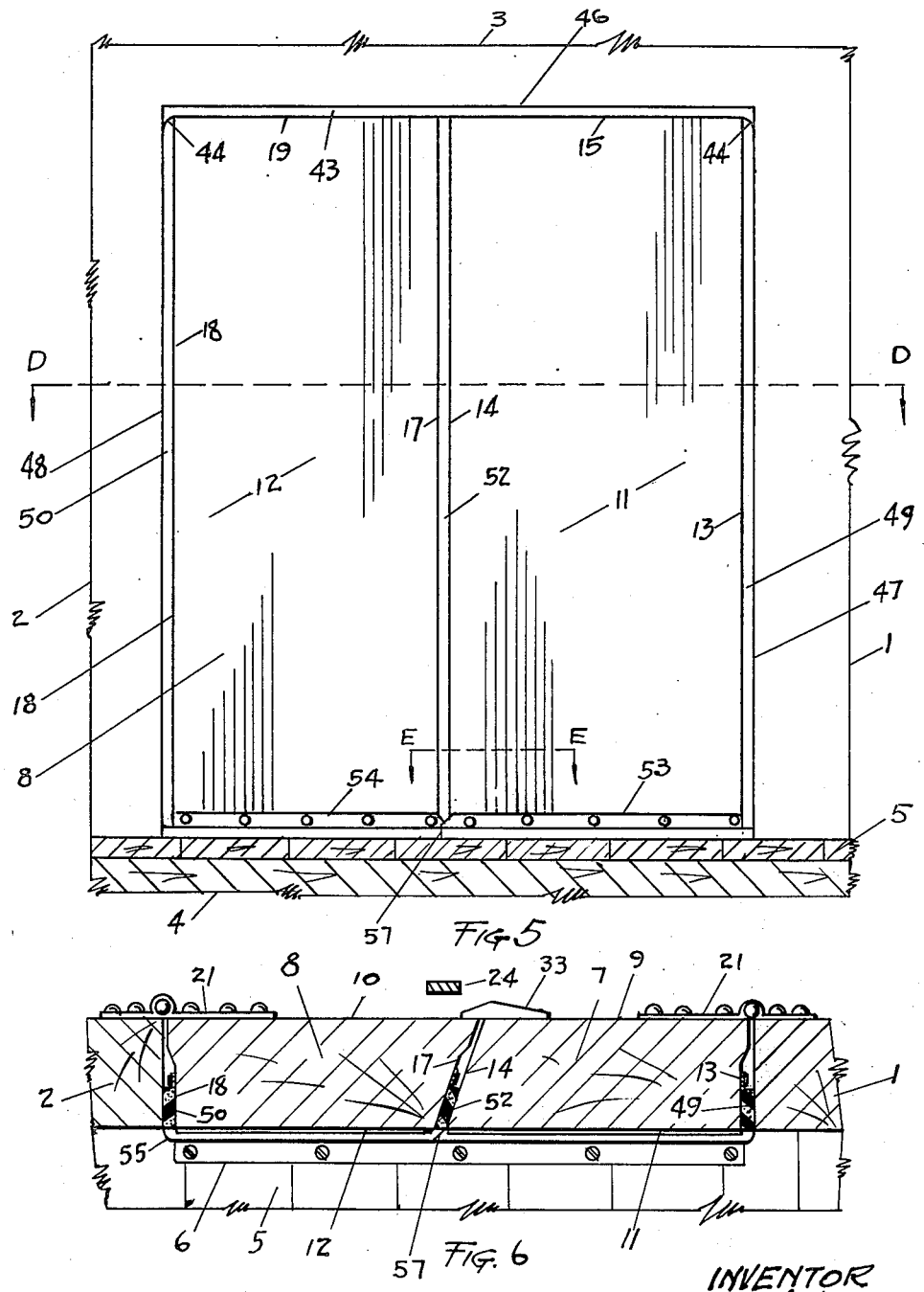

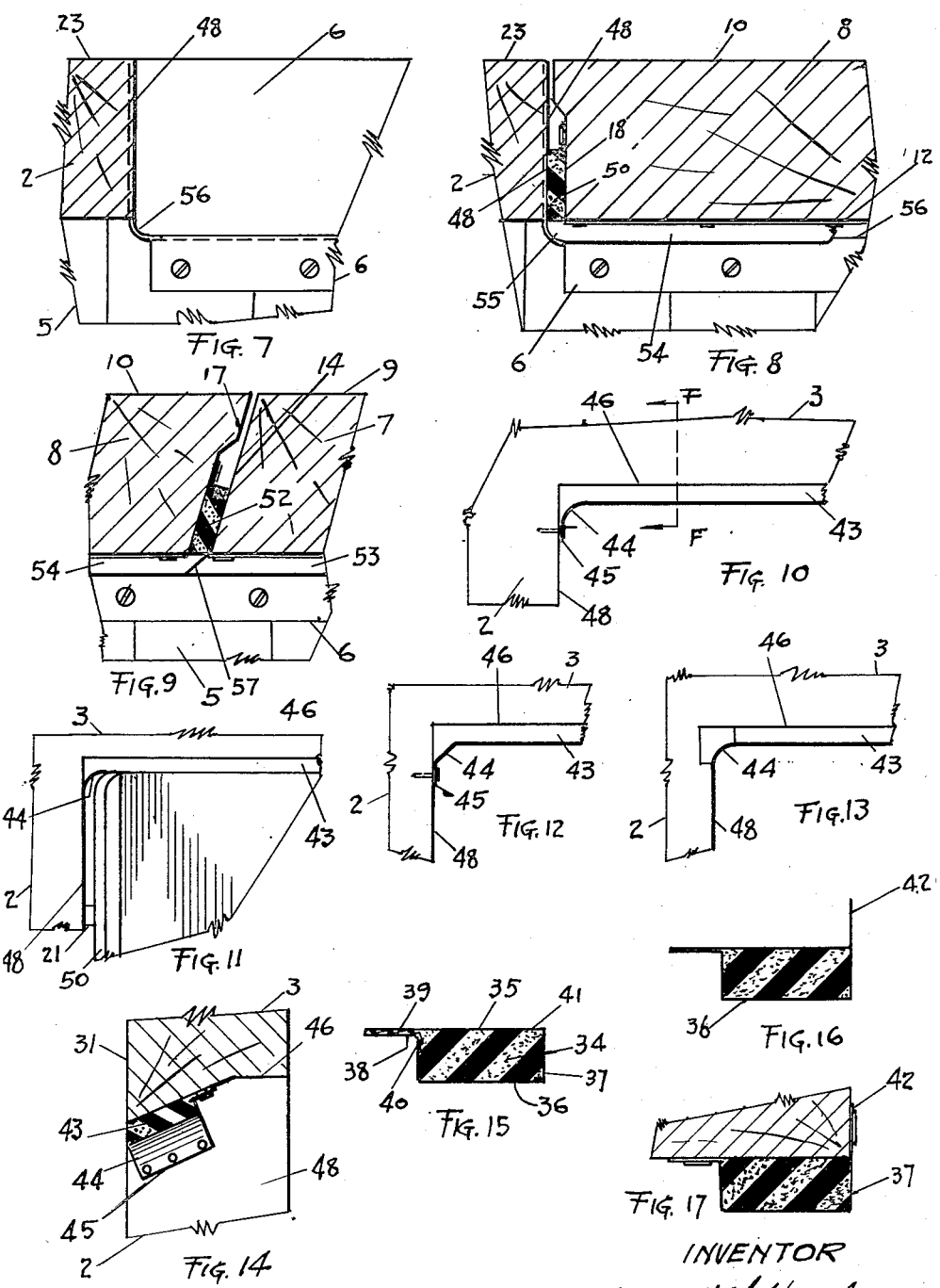

Patented Sept. 11, 1951

2,567,477

UNITED STATES PATENT OFFICE 2,567,477

GASKET STRUCTURE FOR REFRIGERATOR CAR DOORS AND THE LIKE

August W. L. Hartbauer, deceased, late of Chicago, Ill., by Elizabeth C. Hartbauer, representative, Elizabeth, N. J.; Elizabeth C. Hartbauer administratrix of said August W. L. Hartbauer, deceased Continuation of application Serial No. 422,653, filed December 12, 1941. This application filed September 5, 1945, Serial No. 614,530

2 Claims. (Cl. 20—21)

This invention relates to gasket structures for doors, and concerns particularly gasket structures for refrigerator car doors and like installations.

In the installation of gasket structures for doors, and particularly for refrigerator car doors and like installations, difficulty is encountered in providing a satisfactory seal, when the door or doors are in closed position, with structures which can be readily fabricated and assembled without excessive costs due to close tolerances and other manufacturing and assembling problems.

It is an object of the invention to provide a gasket structure for doors and the like, of improved construction and improved operating characteristics.

More specifically stated, it is an object of the invention to provide an improved gasket structure, particularly adapted for refrigerator car doors and like installations, wherein the parts may be readily fabricated and assembled, without the maintenance of close and exacting tolerances, and wherein a satisfactory and tight seal will be effected when the door or doors are in closed position.

It is a further object of the invention to provide an improved gasket structure, of the type and for the purposes defined, which will effect and maintain an adequate seal throughout the life of the structure, regardless of abuses and wear incident to rough usage.

A still further object of the invention is to provide an improved gasket structure of the type defined, which will provide a clear door opening, and which may be readily inspected to ascertain the condition of the various gaskets, for purposes of maintenance and repair.

Various other objects, advantages and features of the invention will be apparent from the following specification when taken in connection with the accompanying drawings, wherein certain preferred structural embodiments are set forth for the purposes of illustration.

In the drawings, wherein like reference numerals refer to like parts throughout:

Figure 1 is a general assembly front view of a refrigerator car door installation incorporating a gasket structure constructed in accordance with and embodying the principles of the invention;

Figure 2 is a partial sectional view of the upper portion of the door structure of Figure 1, on the line A—A thereof;

Figure 3 is a partial sectional view of the lower portion of the door structure of Figure 1, on the line B—B thereof;

Figure 4 is a partial sectional view of the lower door portion, taken as indicated by the line C—C of Figure 1;

Figure 5 is a rear view of the door installation illustrated in Figure 1;

Figure 6 is a horizontal sectional view of the structure of Figure 5, taken as indicated by the line D—D thereof;

Figure 7 is a partial detail view of the lower frame portion and associated threshold plate;

Figure 8 is a view similar to Figure 7 but showing the door in closed position;

Figure 9 is a partial sectional view of a door structure, on the line E—E of Figure 5;

Figure 10 is a partial view of the upper frame structure, showing the header gasket arrangement;

Figure 11 is a view similar to Figure 10, but showing the door in closing position;

Figure 12 is a view similar to Figure 10, illustrating a modified form of header gasket;

Figure 13 is a view, also similar to Figure 10, by illustrating a further modified header gasket structure;

Figure 14 is a partial sectional view of the header gasket and associated frame structures, taken as indicated by the line F—F of Figure 10;

Figure 15 is a cross-sectional and detailed view of one preferred form of gasket member which may preferably be used in the gasket structure and arrangement of the invention;

Figure 16 is a view similar to Figure 15 but showing a modified form of gasket member; and Figure 17 is a detail view illustrating the method of applying the gasket member of Figure 16 to the frame structure.

In the drawings the invention has been shown applied to a door installation for railway refrigerator cars, as the invention in certain of its aspects and features is particularly adapted for such use. It is to be understood, however, that the invention, and its various features and aspects, may also be applied to other types of closure members to be sealed, including specifically different door and hatch closures for refrigeration use and the like.

Referring more specifically to the drawings, in Figure 1 a double door installation of the type conventionally employed for railway refrigerator car use is illustrated, comprising a frame structure and a pair of hinged door members adapted to be swung between open and closed positions, and latched when closed by suitable operating mechanism.

More specifically, the frame structure, comprising a part of the car, comprises a pair of door posts 1 and 2 connected at their upper ends by a header member 3 and at their lower ends by a sill member 4. The car floor portion is indicated at 5, Figures 3 and 4, the sill and floor being covered by a metal threshold plate 6 extending along the length of the sill, and of suitable cross-section to cover the sill and floor portions. As will be seen, the threshold plate slopes forwardly and downwardly, in a manner as best shown in Figures 3 and 4.

The pivoted doors, hinged to the posts 1 and 2, are indicated by the numerals 7 and 8, these doors having front or outer surfaces 9 and 10, as indicated in Figure 1, and rear or inner surfaces 11 and 12, as shown in Figure 5. The side edges of the door 7 are indicated at 13 and 14, and the end edges at 15 and 16, as shown. Similarly, the door 8 is provided with peripheral side edges 17 and 18, and top and bottom end edges 19 and 20, as shown. The doors are suitably hinged to the door posts by hinges, as indicated at 21, the hinges being secured to the outer door faces.

The door operating mechanism 24, for latching the doors in closed position, comprises a pair of door brackets 25, within which are shiftable locking cams 26 adapted to be thrust into engagement with frame brackets 27, whereby to lock the doors in closed position. The cams are actuated by an operating lever 28 cooperable with a latch or stop 29, as shown. Stops 30 are carried by the door 7, engageable with the outer surfaces 31 and 32 of the header and sill members, whereby to limit the closing movement of the doors. Stops 33 are also secured to the door 7 and engage the face surface of the door 8, when the doors are closed to further locate and position the door members when moved to closed position.

Various suitable forms of gasket members may be employed. A preferred form of gasket member is illustrated in Figure 15 and comprises a rubber cushion core 34 forming a pair of yieldable, oppositely disposed bearing surfaces 35 and 36 connected by a side wall portion 37. A flange member 38 of wire mesh, or the like, is angularly formed and extends lengthwise of the core, said member being employed to anchor the gasket member into position upon the supporting parts. More specifically, the flange member 38 comprises a flanged portion 39 adapted to receive securing means, such as a nail, or the like, driven therethrough, and a flange portion or leg 40 engageable with a portion of the side wall of the core member. The core and flange are preferably encased within a cotton duck covering 41 adhesively secured thereto for assembling the gasket member into an integral structural unit. The gasket member, as shown, is more particularly set forth and claimed in my copending application, Serial Number 384,917, now issued as Patent Number 2,363,524.

In Figure 16 an alternate type of gasket member is illustrated, generally similar to that shown in Figure 15, except that the gasket member is in this instance provided with a flange 42 formed as a continuation of the gasket side wall 37, said flange forming a further means for securing the gasket member to its supporting frame or door part, in a manner best illustrated in Figure 17.

As previously indicated, while the preferred form of gasket member is illustrated in Figures 15 to 17, various specific forms of gasket member may be employed.

The gasket structure and arrangement forming a part of the present invention comprises a header gasket 43 extending along the length of the header member 3, in a manner best shown in Figure 5, and provided at its ends with concave downturned portions as indicated at 44, Figures 5, 10 and 11. The extreme gasket ends, as indicated at 45, are secured, as by nailing, respectively to the inner side walls 47 and 48 of the door posts 1 and 2, the main length of the gasket body being secured to the downwardly extending wall 46 of the header member 3.

In Figures 12 and 13 somewhat modified forms of header gasket are illustrated, these gaskets, however, being generally similar to the arrangement of Figure 10 except as to the specific shaping of the downturned gasket end portions 44. In Figure 12 these end portions are indicated as being angularly positioned in respect to the main header length. In Figure 13 the gasket ends are associated with corner fillets of wood or other suitable material to form the curved arc end, as shown.

A pair of vertically disposed gaskets 49 and 50 are carried by the outer side edges of the doors 7 and 8, these gaskets preferably being rounded at their upper ends, as indicated in Figure 11, for cooperation with the rounded downturned ends 44 of the header gasket. By this means the upper ends of the vertical gaskets and the downturned ends of the header gasket are substantially complemental to each other and are wiped into sealing engagement as the doors are closed, in a manner as illustrated in Figure 11, thereby forming a tight sealing engagement between the gasket parts, but without the necessity for accurate fitting or positioning of the parts.

The lower ends 51 (Figure 4) of the vertical door gaskets 49 and 50 are formed square and terminate well above the threshold plate 6 so as to provide ample clearance. As will be understood, the door gaskets 49 and 50 are suitably nailed to the outer peripheral edges 13 and 18, respectively, of the doors 7 and 8.

A vertical center gasket 52 is provided, secured as by nailing to the side wall 17 of the door 8 and cooperable with the side wall 14 of the door 7, to provide sealing engagement, when the doors are brought into closed position. The upper end of the center gasket 52 is formed angularly to conform to the downward and forward slope of the header gasket 43, Figure 14. The lower end of the center gasket is formed square and terminates above the threshold plate 6, the same as with the ends 51 of the door side gaskets 49 and 50.

A pair of bottom gaskets 53 and 54 are nailed to the inner surfaces 11 and 12 of the doors, as best shown in Figure 5. These gaskets are provided with rounded ends 55, Figures 6 and 8, whereby to conform to the contour of the vertical end flanges 56 of the threshold plate 6. At the point of juncture between the doors, the ends of the gaskets 53 and 54 are angularly cut to provide complementary meeting surfaces when the doors are brought into closed position, Figures 6 and 9. As will be seen, the outer ends of the gaskets 53 and 54 overlap the door side gaskets 49 and 50, whereas the inner ends of the bottom door gaskets 53 and 54 overlap each other, due to their angular ends, and also overlap with the center door gasket 52. As the doors are moved into closed position, Figures 3 and 4, the vertical wall of the threshold plate compresses the gaskets 53 and 54 tightly into engagement with the door side gaskets 49 and 50 at their outer ends, and with each other and into engagement with the door gasket 52 at their inner ends, whereby to provide a tight seal when the doors are in closed position, but without the necessity for accurate positioning of the parts.

It will be seen that the gasket parts are so arranged that a tight and effective seal is maintained around the complete peripheries of the doors, when in closed position, but without the necessity for accurate or meticulous placement of the gasket members. By this means the fabrication and assembly of the gasket structures are facilitated. Also the door members may be made sufficiently loose in respect to the frame opening to be closed so as to preclude the danger of sticking due to variations in climatic conditions. Still further, looseness between the doors and frame in the original assemblies, or due to climatic variations or rough usage, in no way impairs the efficiency of the gasket seal.

When the doors are in open position, a clear opening is provided, and there is no danger that the gaskets will be struck or mutilated as trucks are moved through the door openings. The rear portions of the entire gasket structure are visible from within the door opening when the doors are closed, as shown in Figure 5, thereby facilitating gasket inspection for maintenance and repair purposes.

This application is a continuation of a copending application Serial Number 422,653, filed December 12, 1941 by the late August W. L. Hartbauer.

It is obvious that various changes may be made in the specific embodiments set forth without departing from the spirit of the invention. Accordingly the invention is not to be limited to the specific embodiments shown and described but only as indicated in the following claims.

The invention is hereby claimed as follows:

1. A closure for refrigerator car doors comprising in combination with a frame having an opening and a hingedly mounted door arranged to be swung to and from closed positions relative to said opening, a header gasket for sealing one end of the door and extending across the frame opening and secured to the frame, said header gasket including an end portion disposed at a corner of the frame and extending slightly along the adjacent frame side and being relieved substantially at the corner of the frame to present a sealing surface facing angularly inwardly of the frame opening, a gasket for sealing the other end of the door, and side gaskets for sealing the door side edges, one of said side gaskets being secured to the door and having an end sealing surface shaped substantially complementally to the sealing surface of the said header gasket and projecting toward the same sufficiently to be progressively wiped into tighter sealing engagement with the relieved sealing surface of said header gasket as the door is moved to closed position.

2. A closure for refrigerator car doors as claimed in claim 1, wherein the juxtaposed sealing surfaces of the ends of said header gasket and one of said side gaskets are respectively concave and convex to progressively approach one another in tighter sealing engagement as the door is moved to closed position.

ELIZABETH C. HARTBAUER,

*Representative of Estate of August W. L. Hartbauer, Deceased.*

REFERENCES CITED

The following references are of record in the file of this patent:

UNITED STATES PATENTS

| Number | Name | Date |
| --- | --- | --- |
| 386,221 | Settlemire | July 17, 1888 |
| 444,869 | Simmerman | Jan. 20, 1891 |
| 2,189,795 | Hartbauer | Feb. 13, 1940 |